United States Patent [19]
Weber

[11] Patent Number: 6,100,609
[45] Date of Patent: Aug. 8, 2000

[54] COMPACT ELECTRIC LINEAR ACTUATOR

[75] Inventor: Ernest Weber, Montigny les Metz, France

[73] Assignee: Wernest, Jarny, France

[21] Appl. No.: 09/142,761

[22] PCT Filed: Mar. 13, 1997

[86] PCT No.: PCT/FR97/00454

§ 371 Date: Oct. 19, 1998

§ 102(e) Date: Oct. 19, 1998

[87] PCT Pub. No.: WO97/34356

PCT Pub. Date: Sep. 18, 1997

[30] Foreign Application Priority Data

Mar. 13, 1996 [FR] France ............................ 96 03172

[51] Int. Cl.[7] .................................................. H02K 7/06
[52] U.S. Cl. ................................ 310/12; 310/20; 310/80
[58] Field of Search ................................. 310/12, 20, 80; 74/89.15, 424.8 B, 441

[56] References Cited

U.S. PATENT DOCUMENTS

| | | | |
|---|---|---|---|
| 3,751,998 | 8/1973 | Vasilatos | 74/89.15 |
| 3,788,261 | 1/1974 | Colin | 114/249 |
| 4,428,423 | 1/1984 | Koehler et al. | 166/231 |
| 4,496,921 | 1/1985 | Carrera | 335/258 |
| 5,117,700 | 6/1992 | Trechsel | 74/89.15 |
| 5,619,082 | 4/1997 | Chei | 310/88 |

FOREIGN PATENT DOCUMENTS

| | | |
|---|---|---|
| 35 38 710 | 12/1986 | Germany. |
| 94 12 104 | 1/1995 | Germany. |

Primary Examiner—Nestor Ramirez
Assistant Examiner—Judson H. Jones
Attorney, Agent, or Firm—Young & Thompson

[57] ABSTRACT

An electric actuator including a gear motor (1), a tubular body (3) containing a piston (2), and a connection of the motor to the piston. The piston consists of a tube (2) slidable within the body. The motor (1) is housed within the piston and secured to an end flange (4) thereof, and the output shaft (8) of the motor rotates a plug (9) provided with a screw thread (11) meshed with a complementary thread (12) on the inner wall of the body (3). As the gear motor (1) is housed within the tubular piston (2), the actuator is exceptionally compact and quiet, and the problem of the buckling of threaded rods in conventional actuators is avoided since said rods have been replaced by a tubular piston (2). Furthermore, this arrangement makes the actuator easy to seal.

9 Claims, 3 Drawing Sheets

COMPACT ELECTRIC LINEAR ACTUATOR

BACKGROUND OF THE INVENTION

The present invention concerns an electric linear actuator of the type comprising an electric motor, a tubular body comprising a piston and connecting means between the motor and the piston (commonly known as a jack).

Electric linear actuators used until now have been driven by an electric motor disposed outside the body of the linear actuator rotating a screwthreaded rod through a gear, the rod driving the piston of the linear actuator.

Linear actuators of the above kind are bulky, permeable because they are not sealed and fragile because the force is transmitted to the piston by a screwthreaded rod. There is a risk of the rod buckling when the linear actuator is operating in compression with a long travel.

Sealing against dust, inclement weather and moisture is difficult because the linear actuator is in two parts.

SUMMARY OF THE INVENTION

An aim of the invention is therefore to propose an electric linear actuator in which the above drawbacks are eliminated.

In accordance with the invention, the piston of the linear actuator is a tube mounted to slide in the body, the motor is housed inside the piston and the aforementioned connecting means cooperate with the inside wall of the body to move the piston in thrust or in traction.

Placing the motor inside a tubular piston of the linear actuator means that the linear actuator can be made in one compact unit of considerably reduced overall size.

In a preferred embodiment of the invention, the body and the piston being cylindrical, the motor is a gear motor one end of which is attached to the piston and an output shaft of which is adapted to rotate a nut provided with an external screwthread meshing with a complementary internal screwthread on the inside wall of the body.

In this way the electric gear motor transmits its rotation to the nut at the end of the gearbox and bearing directly on the screwthread in the linear actuator body.

A structure of the above kind therefore eliminates the screwthreaded rod for transmitting the force of the linear actuator and the associated risk of the rod buckling, because it is the tubular body of the linear actuator that receives the reaction forces.

BRIEF DESCRIPTION OF THE DRAWINGS

Other features and advantages of the invention will become apparent during the following description given with reference to the accompanying drawings which show two embodiments by way of non-limiting example.

DESCRIPTION OF THE PREFERRED EMBODIMENTS

Figure 1:
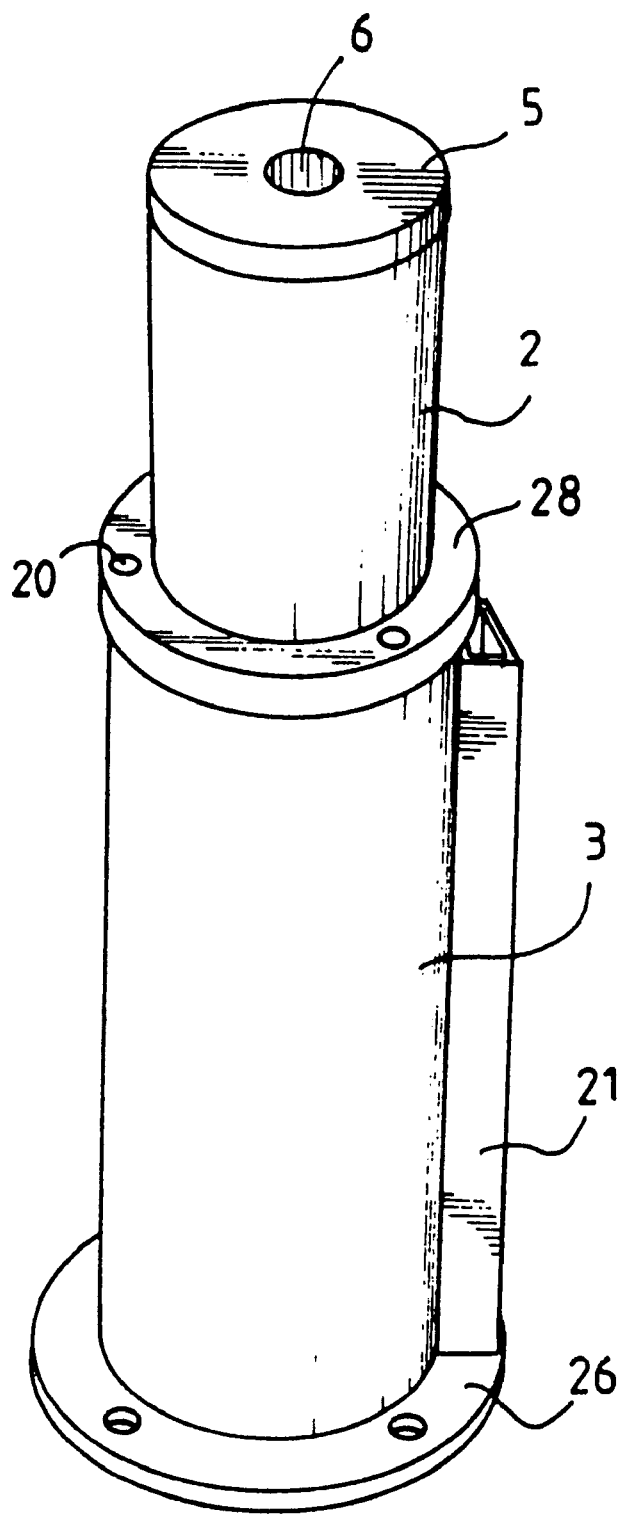
FIG. 1 is a perspective view of a first embodiment of the electric linear actuator of the invention, shown with the piston deployed.

The electric linear actuator shown in the drawings comprises an electric gear motor 1 disposed inside a tubular piston 2 coaxial with the longitudinal axis XX of the piston. The cylindrical piston 2 slides along the axis XX inside a tubular body 3.

The piston 2 is closed at one end by a transverse flange 4 to which an end face of the gear motor 1 is fixed. Its opposite end is closed by a stopper 5 through which passes a bore 6 to receive an attachment (not shown).

One end 8 of the output shaft of the gear motor 1 passes axially through the flange 4 and is attached by a key 8a to a nut 9 which can therefore be rotated by the shaft end 8. The nut 9 includes a central sleeve 9a surrounding the shaft 8 and has an external screwthread 11 meshing with a complementary internal screwthread 12 on the inside wall of the cylindrical body 3 over a distance corresponding to the intended travel of the piston 2. The screwthreads 11 and 12 have rectangular cross-sections, preferably square cross-sections (FIG. 5), with a large clearance j between the conjugate teeth 11a, 12a, preferably a clearance in the order of approximately 0.5 mm. The nut 9 is fixed to a disk 13 with a central opening concentric with a central cylindrical flange 4a of the flange 4 surrounding the sleeve 9a. The nut 9 is attached to the disk 13 by longitudinal screws 14, one of which can be seen in FIG. 2.

Needle roller bearings 15 are disposed between the disk 13, on the one hand, and on the flange 4 and a ring-nut 16 screwed onto the end of the flange 4a, on the other hand. The linear actuator is also provided with means for preventing the cylindrical body 2 rotating relative to the piston 3. In the example shown these means comprise a tubular stud 17 fixed to the piston 2, extending transversely through the body 3 and able to slide in a longitudinal slot 18 in the body 3. The stud 17 is fixed to the piston 2 by screws 17a and delimits an opening 10 through which an electric wire 22 passes.

A sheath 21 for protecting the electric wire or cable 30 supplying power to the gear motor 1 is housed in a longitudinal opening 19 in the wall of the body 3 facing the slot 18. The wire 30 extends inside a coil spring 22 forming a U-shape loop 22a in the sheath 21. The sheath, which preferably has a U-shape profile as seen in FIG. 3, extends longitudinally from one end to the other of the body 3 to which it is fixed by appropriate means, not shown. An obturator 23 closes the sheath 21 at the level of the flange 28. The sheath 21 receives part of the length of the electric wire 30. The two runs of the loop 22a lie in a plane substantially perpendicular to that of FIG. 2, as can be seen in FIG. 3. Accordingly, the wire 30 extends first from the end of the gear motor 1 facing towards the stopper 5 and then between the gear motor 1 and the piston 2 as far as the tubular stud 17, passing through the opening 10 in the stud into the sheath 21. The wire 30 passes through an opening 25 in the sheath 21 and a cable gland 24 for connection to the mains electrical power supply.

On the side of the piston 2 opposite the stopper 5 the body 3 is closed off by a cover 26 fixed to the body 3 by screws 27, for example. The linear actuator is also provided with sealing means. In the example shown, the end of the body 3 contiguous to the end stopper 5 is provided with a ring 28 fixed to the body 3 by screws 20. A seal 29 is disposed between the ring 28, the end of the body 3 and the piston 2, the seal 29 being housed in a corresponding groove in the body 3. A second ring 31 for sealing and guiding the piston 2 is accommodated in the inside wall of the body 3 to complete the seal with the piston 2.

Another seal 32 is advantageously disposed between the cover 26 and the body 3, being housed in a groove formed in the end of the body 3.

The electric linear actuator that has just been described operates in the following manner.

Figure 2:
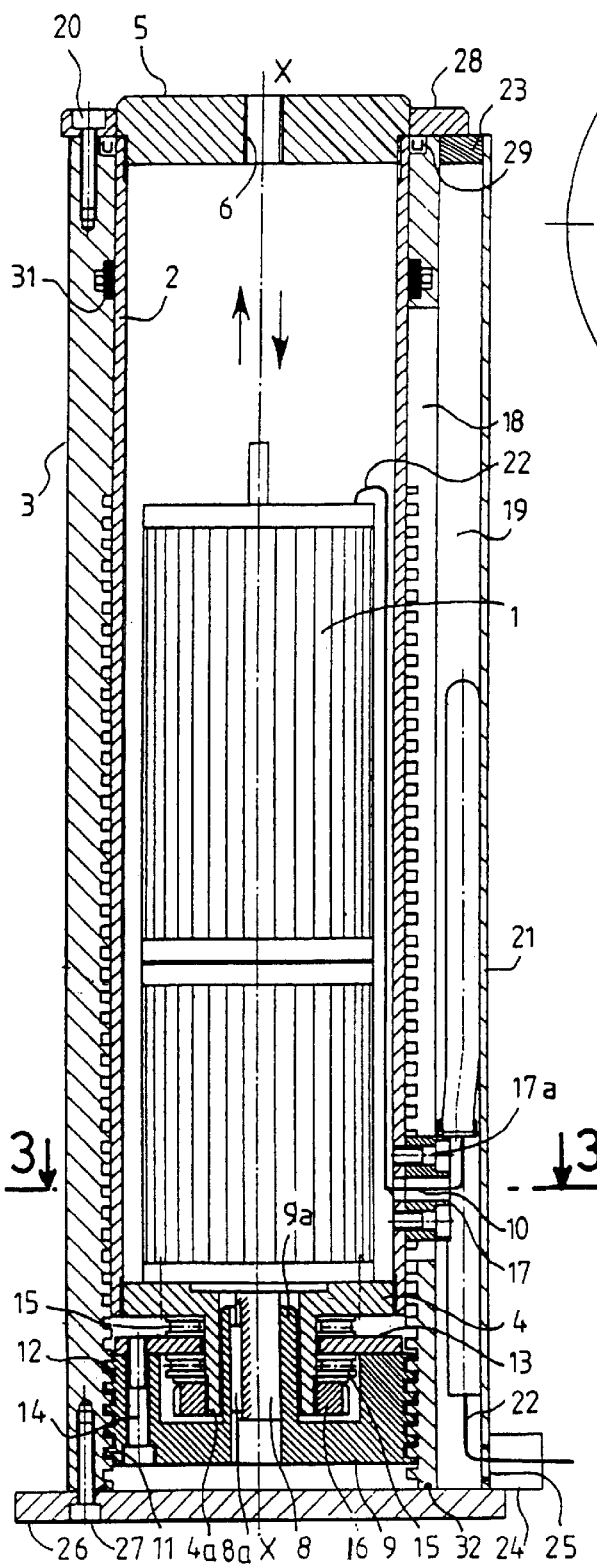
FIG. 2 is a view of the linear actuator from FIG. 1 in axial longitudinal section with the piston retracted inside the body.
Figure 3:
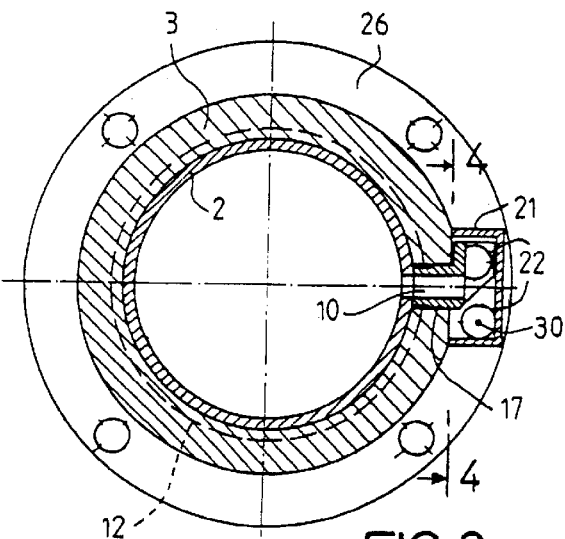
FIG. 3 is a view in cross-section taken along the line 3—3 in FIG. 2, the gear motor having been removed.

The wire 30 being connected to the mains electrical power supply and the gear motor 1 and the piston 2 being assumed to be in their extreme bottom positions shown in FIG. 2, when the gear motor 1 is operated in the appropriate direction its shaft end 8 rotates the nut 9. The screwthread 11 slides with clearance in the screwthread 12, applying a longitudinal thrust to the disk 13. This thrust is transmitted to the flange 4 via the needle roller bearings 15 and thus to the tubular piston 2, which begins to deploy from the body 3 with its attachment 7 and the gear motor 1 inside it.

During the movement in translation of the piston 2 the wire 30 is entrained so that the loop formed by the wire in the sheath 21 is progressively paid out via the transverse stud 17, continuing to be protected by the spring sheath 22, as the stud 17 moves in translation in the slot 18.

Figure 4:
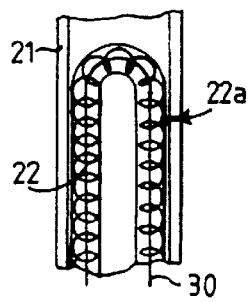
FIG. 4 is a partial view in elevation to a larger scale on the line 4—4 in FIG. 3.

When the gear motor 1 is operated in the opposite direction the nut 9 turns in the opposite direction and therefore retracts the piston 2 inside the body 3, the loop formed by the wire 30 in the sheath 21 being progressively closed up and the stud 17 returning to its initial position. The spiral winding of the wire 30, shown only in FIG. 4, imparts some elasticity to it which facilitates the reforming of the loop 22a during the return travel of the piston 2.

Figure 5:
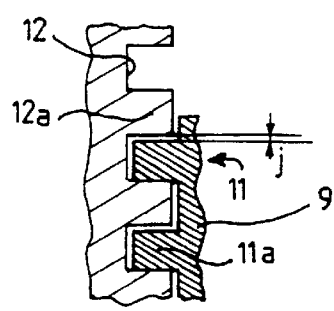
FIG. 5 is a part-sectional view to a larger scale of a detail from FIG. 2.

The nut 9 is advantageously made from a hard material such as steel and the tubular body 3 is formed from a composite material of high mechanical strength with a very low coefficient of friction. A pair of materials of the above kind assures satisfactory sliding between the nut 9 and the body 3. Furthermore, to avoid all risk of the nut 9 jamming in the body 3, it is necessary for the large clearance j previously mentioned to be provided between the teeth 11a and 12a (FIG. 5). A small clearance (for example 0.1 mm) could lead to the nut 9 jamming in the body 3 and thereby jamming the linear actuator.

Moreover, the fact that the screwthread 11 and the screwthread 12 have teeth 11a, 12a of rectangular, preferably square, cross-section has the advantage that in the event of failure of the electrical power supply the nut 9 remains in its position within the body 3 and does not drop back; the piston 2 therefore remains in its previous position.

Housing the gear motor 1 inside the piston 2 considerably reduces the overall size of the linear actuator as a whole and makes it particularly compact. Moreover, as already indicated, this transformation eliminates the screwthreaded rod of conventional electric linear actuators and therefore the risk of this rod buckling.

The fact that the motor 1 is inside the piston 2 also makes the linear actuator particularly quiet in operation.

Figure 6:
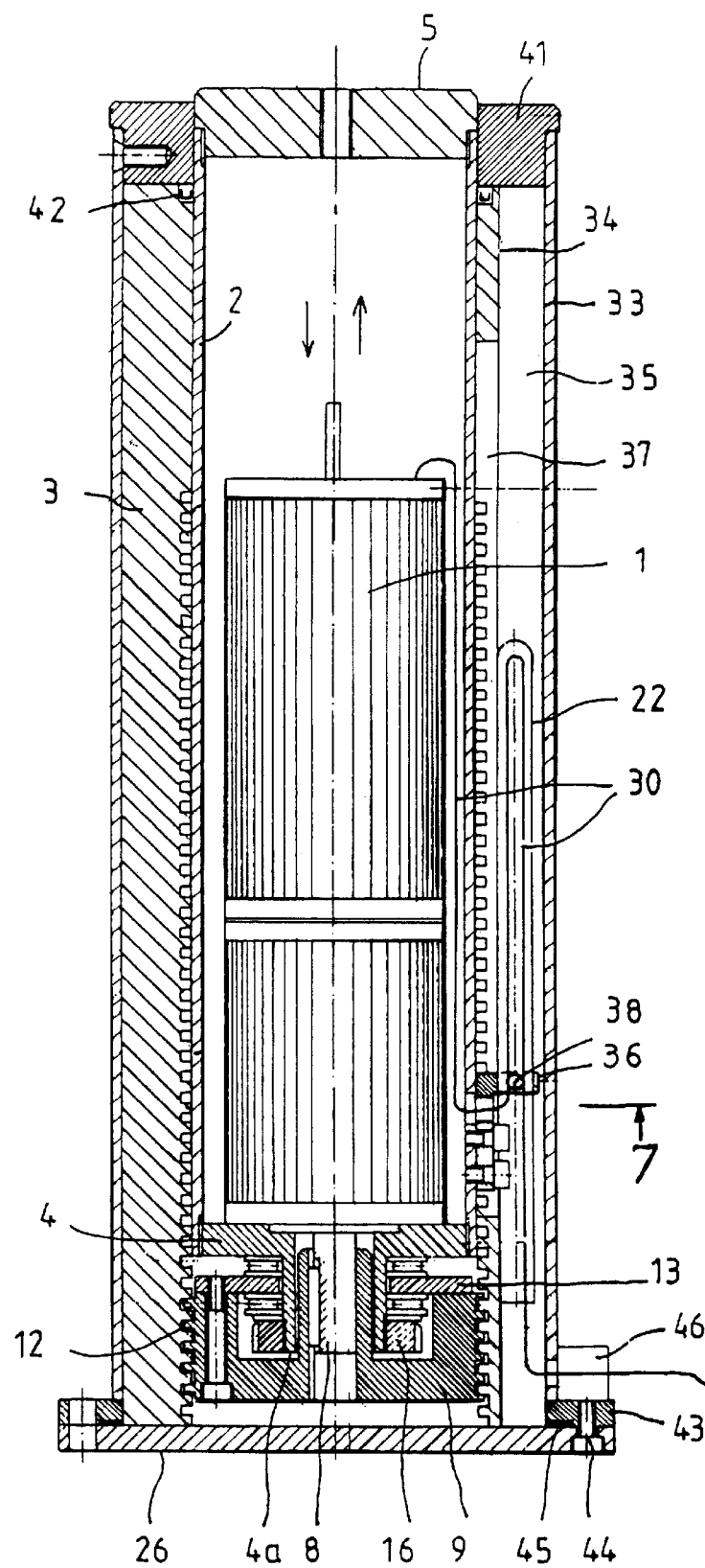
FIG. 6 is a view similar to FIG. 2 of a second embodiment of the electric linear actuator of the invention.
Figure 7:
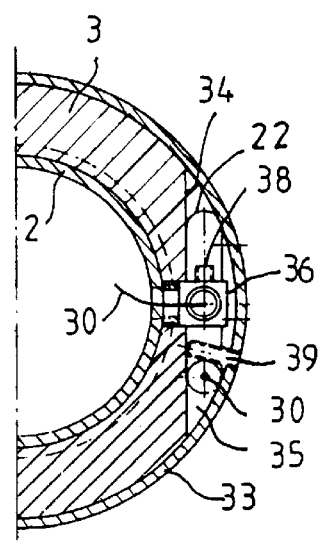
FIG. 7 is a half-sectional view taken along the line 7 in FIG. 6.

The second embodiment of the linear actuator, shown in FIGS. 6 and 7, includes a cylindrical external jacket 33 around the body 3. On the body a longitudinal flat 34 delimits with the corresponding sector of the jacket 33 a gap 35 which contains the spring 22 through which the electric wire 30 passes to form a loop as in the previous embodiment.

The spring 22 passes through a stud 36 fixed to the piston 2 and able to slide in a longitudinal opening 37 in the body 3. A screw 38 mounted on the stud 36 attaches the spring 22 to it and a second screw 39 passing through the jacket 33 holds the spring 22 in place in the space 35.

At its upper end (assuming the linear actuator is vertical) the linear actuator has a ring 41 for closing off the annular gap between the jacket 33 and the stopper 5. A seal is provided by a seal 42 disposed between the body 3 and the ring 41.

At the bottom end of the linear actuator a flange 43 is fixed to the sleeve 33 and to the cover 26 by screws 44, a seal 45 being disposed between the cover 26 and the flange 43.

The electric wire 30 passes through a cable gland 46 near the flange 43, which seals it.

The external jacket 33, which is preferably made from a composite material, advantageously soundproofs the linear actuator.

The linear actuator can easily be miniaturised to suit appropriate applications and there is no limit as to its possible applications.

What is claimed is:

1. An electric linear actuator comprising:

an electric motor (1), a tubular cylindrical body (3) that is stationary on a support plane when the motor is actuated, the body containing a movable cylindrical piston (2) and connecting means for connecting the motor and the piston, wherein the piston is a tube (2) mounted to slide inside the body, the motor is housed inside the piston and is movable with the piston, and said connecting means (4, 9, 13) cooperate with an inside wall of the body to move the piston in thrust or in traction, and the motor (1) is a gear motor, one end of which is attached to the piston and an output shaft (8) of which is adapted to rotate a nut (9) having an external screwthread (11) meshing with a complementary internal screwthread (12) on the inside wall of the body.

2. An electric linear actuator according to claim 1, wherein teeth (11a, 12a) of the screwthread (11) on the nut (9) and of the complementary screwthread (12) on the body (3) have rectangular sections with a clearance (j) between the teeth of the screwthreads that is preferably in the order of approximately 0.5 mm.

3. An electric linear actuator according to claim 1, further comprising means for preventing the piston (2) rotating relative to the body that includes a stud (17) fixed to the piston extending transversely through the body (3) and able to slide in a longitudinal slot (18) in the body.

4. An electric linear actuator according to claim 1, further comprising sealing means for sealing a space between the piston and the body.

5. An electric linear actuator comprising:

an electric motor (1), a tubular body (3) containing a piston (2) and connecting means between the motor and the piston, wherein the piston is a tube (2) mounted to slide in the body, the motor is housed inside the piston and said connecting means (4, 9, 13) cooperate with the inside wall of the body to move the piston in thrust or in traction, wherein the body (3) and the piston (2) are cylindrical, the motor (1) is a gear motor, one end of which is attached to the piston and an output shaft (8) of which is adapted to rotate a nut (9) having an external screwthread (11) meshing with a complementary internal screwthread (12) on the inside wall of the body, wherein the nut (9) is fixed to a disk (13) disposed between said nut and a transverse flange (4) of the piston (2) to which the gear motor (1) is fixed.

6. An electric linear actuator comprising:

an electric motor (1), a tubular body (3) containing a piston (2) and connecting means between the motor and the piston, wherein the piston is a tube (2) mounted to slide in the body, the motor is housed inside the piston and said connecting means (4, 9, 13) cooperate with the inside wall of the body to move the piston in thrust or in traction, wherein the body (3) and the piston (2) are cylindrical, the motor (1) is a gear motor, one end of which is attached to the piston and an output shaft (8) of which is adapted to rotate a nut (9) having an external screwthread (11) meshing with a complementary internal screwthread (12) on the inside wall of the body, and a sheath (21) for protecting an electric wire (30) supplying power to the motor (1) is housed in the wall of the body (3), said wire being inside a coil spring (22) forming a loop (22a) in the sheath (21), the sheath extending longitudinally to receive a loop formed by a part of the length of the wire so that the loop can be paid out or reformed in order to accompany the movements in translation of the motor (1) and the piston (2), and wherein openings (10) for the wire to pass through are provided in the body and in the wall of the piston as well as (25) in the sheath for the connection to the power supply.

7. A linear actuator comprising:

an electric motor (1), a tubular body (3) containing a piston (2) and connecting means between the motor and the piston, wherein the piston is a tube (2) mounted to slide in the body, the motor is housed inside the piston and said connecting means (4, 9, 13) cooperate with the inside wall of the body to move the piston in thrust or in traction, wherein the body (3) and the piston (2) are cylindrical, the motor (1) is a gear motor, one end of which is attached to the piston and an output shaft (8) of which is adapted to rotate a nut (9) having a external screwthread (11) meshing with a complementary internal screwthread (12) on the inside wall of the body, wherein the piston (2) has an end stopper (5) at the end opposite the nut (9), the contiguous end of the body (3) is provided with a ring (28) of the piston, and a seal (29) is disposed between the ring, the body and the piston.

8. An electric linear actuator according to claim 7 wherein the end of the body (3) opposite said ring (28) is formed by a cover (26) provided with a seal (32) between the cover and the end of the body.

9. An electric linear actuator comprising:

an electric motor (1), a tubular body (3) containing a piston (2) and connecting means between the motor and the piston, wherein the piston is a tube (2) mounted to slide in the body, the motor is housed inside the piston and said connecting means (4, 9, 13) cooperate with the inside wall of the body to move the piston in thrust or in traction, wherein the body (3) and the piston (2) are cylindrical, the motor (1) is a gear motor, one end of which is attached to the piston and an output shaft (8) of which is adapted to rotate a nut (9) complementary internal screwthread (12) on the inside wall of the body, and an external jacket (33) surrounding the body (3), wherein a space (35) containing an electric wire (30) supplying power to the motor is formed between the jacket (33) and the body (3).

* * * * *